(12) United States Patent
Kern et al.

(10) Patent No.: US 8,458,324 B2
(45) Date of Patent: Jun. 4, 2013

(54) DYNAMICALLY BALANCING RESOURCES IN A SERVER FARM

(75) Inventors: Eric R. Kern, Chapel Hill, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 12/546,820

(22) Filed: Aug. 25, 2009

(65) Prior Publication Data

US 2011/0055370 A1  Mar. 3, 2011

(51) Int. Cl.
G06F 15/173 (2006.01)
(52) U.S. Cl.
USPC .......................................... 709/224; 709/223
(58) Field of Classification Search
USPC ................. 709/224, 223
See application file for complete search history.

(56) References Cited

U.S. PATENT DOCUMENTS

| | | | |
|---|---|---|---|
| 6,816,905 B1 | 11/2004 | Sheets et al. | |
| 7,127,716 B2 | 10/2006 | Jin et al. | |
| 7,200,657 B2 | 4/2007 | Adams et al. | |
| 7,640,287 B1 * | 12/2009 | Gai et al. | 709/200 |
| 2003/0191795 A1 | 10/2003 | Bernardin et al. | |
| 2004/0024853 A1 | 2/2004 | Cates et al. | |
| 2005/0120160 A1 * | 6/2005 | Plouffe et al. | 711/1 |
| 2006/0155912 A1 * | 7/2006 | Singh et al. | 711/6 |
| 2007/0174851 A1 | 7/2007 | Smart | |
| 2007/0180452 A1 | 8/2007 | Hirayama et al. | |
| 2007/0250838 A1 | 10/2007 | Belady et al. | |
| 2007/0297428 A1 | 12/2007 | Bose et al. | |
| 2008/0127199 A1 | 5/2008 | Miki | |
| 2008/0172429 A1 * | 7/2008 | Lin et al. | 707/205 |
| 2009/0089699 A1 * | 4/2009 | Saha et al. | 715/771 |

FOREIGN PATENT DOCUMENTS

| | | |
|---|---|---|
| JP | 2006/228220 A | 8/2006 |
| WO | WO 03005192 A1 | 1/2003 |

* cited by examiner

*Primary Examiner* — David Lazaro
*Assistant Examiner* — Marie Georges Henry
(74) *Attorney, Agent, or Firm* — Brandon C. Kennedy; Cynthia G. Seal; Biggers & Ohanian, LLP

(57) ABSTRACT

Methods, apparatus, and products are disclosed for dynamically balancing resources in a server farm, the server farm comprising a plurality of servers organized in functional server groups with the servers in each functional server group assigned a same type of data processing task, the servers operatively coupled to data storage through a packet switching fabric, the servers operatively coupled to a system management server, the methods, apparatus, and products including: monitoring, by a resource balancing module of the system management server, CPU utilization in at least one of the functional server groups; identifying, by the resource balancing module in dependence upon the monitored CPU utilization, an overburdened functional server group, the overburdened functional server group's CPU utilization exceeding a CPU overburden threshold; and increasing, by the resource balancing module, CPU resources of the overburdened functional server group, including moving a transfer server from a source functional server group into the overburdened functional server group.

17 Claims, 6 Drawing Sheets

DYNAMICALLY BALANCING RESOURCES IN A SERVER FARM

BACKGROUND OF THE INVENTION

1. Field of the Invention

The field of the invention is data processing, or, more specifically, methods, apparatus, and products for dynamically balancing resources in a server farm.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

A server farm is a collection of computer servers and associated components. A typical server farm may be used to distribute processing workload amongst the servers in the server farm in order to expedite computational processing and use available resources more efficiently. A server farm may be organized into functional groups of servers performing similar data processing tasks. The resources available to each functional server group have traditionally been monitored by system administrators. When any one of the groups becomes overburdened, an upgrade is performed—usually by the system administrator buying one or more new servers and manually assigning them to the overburdened functional server group. System administrators often must plan each server group for the peak expected workload, resulting in inefficient utilization of server resources during non-peak workloads. Further inefficiencies result from the fact that workload is often unbalanced between functional server groups, meaning that the resources of one group may be substantially unutilized while another group is overburdened.

SUMMARY OF THE INVENTION

Methods, apparatus, and products are disclosed for dynamically balancing resources in a server farm, the server farm including a plurality of servers organized in functional server groups with the servers in each functional server group assigned a same type of data processing task, the servers operatively coupled to data storage through a packet switching fabric, the servers operatively coupled to a system management server, the methods, apparatus, and products including: monitoring, by a resource balancing module of the system management server, CPU utilization in at least one of the functional server groups; identifying, by the resource balancing module in dependence upon the monitored CPU utilization, an overburdened functional server group, the overburdened functional server group's CPU utilization exceeding a CPU overburden threshold; and increasing, by the resource balancing module, CPU resources of the overburdened functional server group, including moving a transfer server from a source functional server group into the overburdened functional server group.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
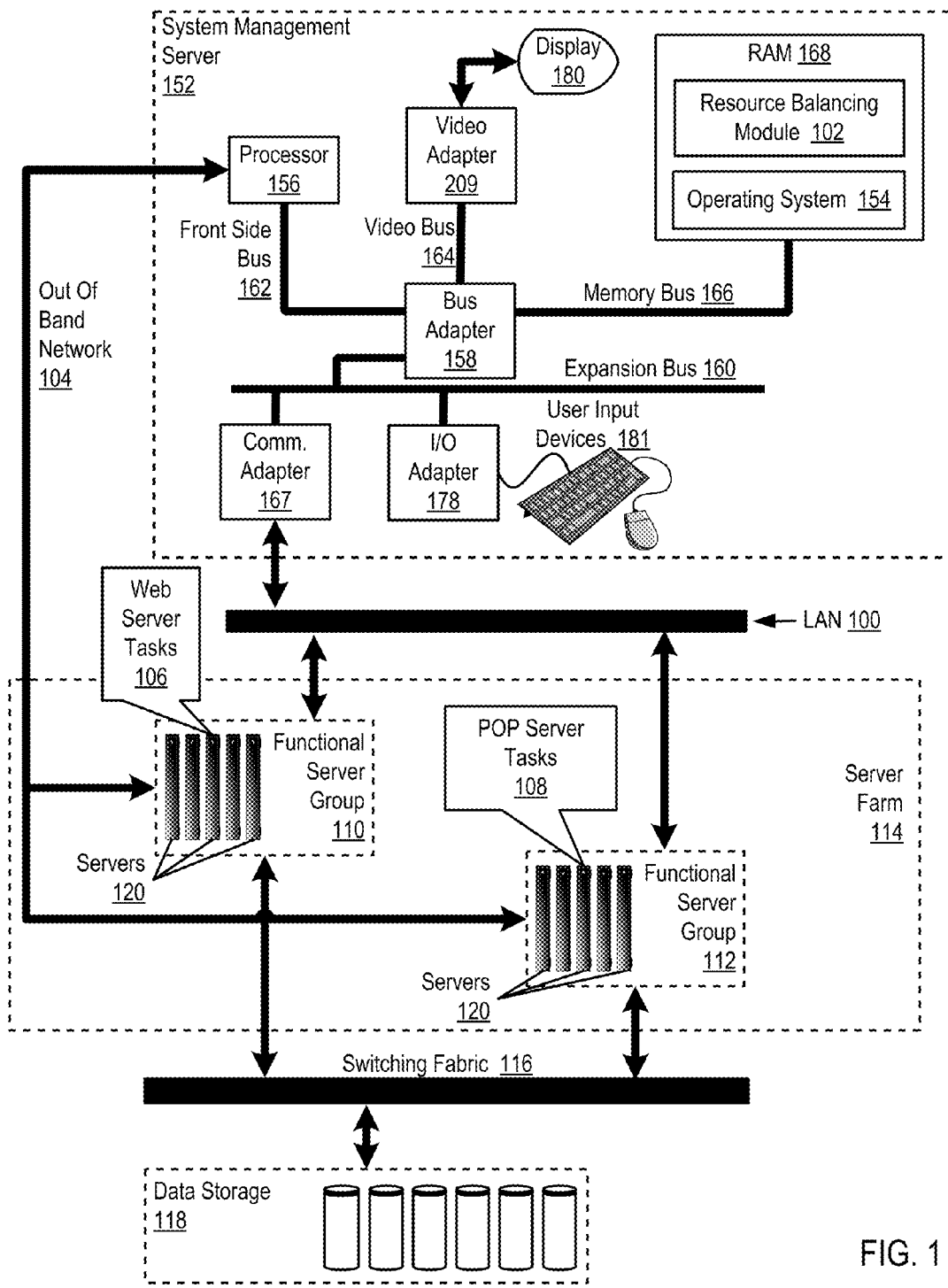
FIG. 1 sets forth a block diagram of an example system implementing dynamically balancing resources in a server farm according to embodiments of the present invention.

Example methods, apparatus, and products for dynamically balancing resources in a server farm in accordance with the present invention are described with reference to the accompanying drawings, beginning with the block diagram of FIG. 1. FIG. 1 sets forth a block diagram of apparatus, automated computing machinery, useful in dynamically balancing resources in a server farm according to embodiments of the present invention. The apparatus in the example of FIG. 1 includes a server farm (114) which in turn includes a number of servers (120) organized in functional server groups (110, 112), with the servers operatively coupled through an in-band network (100) and an out-of-band network (104) to a system management server (152). The servers (120) in the server farm (114) are also operatively coupled to data storage (118) through a packet switching fabric (116).

The server farm (114) in the example of FIG. 1 is a collection of computer servers and associated components. A typical server farm may be used to distribute processing workload amongst the servers in the server farm in order to expedite computational processing. Server farm (114) includes a number of functional server groups (110, 112), each of which includes a number of servers (120). The servers in each functional server group are assigned to perform a same type of data processing tasks, such as a particular type of server application. That is, the servers in functional server group (110) are all assigned the same kind of data processing task—web service, email service, and so on. The servers in functional service group (112) are generally assigned some other kind of task, with all the same type of task within the same functional server group. In particular in the example of FIG. 1, functional server group (110) is assigned web server tasks (106), while functional server group (112) is assigned POP server tasks (108).

A server, as the term is used in this specification, refers generally to a multi-user computer that provides a service (e.g. database access, file transfer, remote access) or resources (e.g. processing bandwidth, file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

In some embodiments of the present invention, servers (120) may be blade servers. Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers may be installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

The example system of FIG. 1 also includes a switching fabric (116) coupling the servers (120) in the server farm (114) to data storage (118). Data storage (118) may be a disk drive, disk drive array, or any other type of nonvolatile data storage system. A switching fabric is a network architecture including hardware and software that transmits data between network nodes and into and out of a network via network switches. Switching fabric (116) may be implemented, for example, as a Fibre Channel. Fibre Channel (FC) is an industry standard networking scheme for sharing remote storage devices among a group of servers. A Fibre Channel is a high-speed physical data transmission layer designed to handle multiple nodes connected to network switches or servers. A Fibre Channel allows each of the servers (120) to have simultaneous access to data storage (118) as well as the LAN (100). In other embodiments, switching fabric (116) may be implemented using other topologies, for example InfiniBand or Ethernet Fabric Switch.

The example system of FIG. 1 includes a system management server (152) which is connected for data communications to the servers (120) through the local area network ('LAN') (100) and also through the out-of-band network (104). The LAN (100) may be implemented as an Ethernet, an IP (Internet Protocol) network, or the like, and the out-of-band network (104) may be implemented as an Inter-Integrated Circuit ('I$^2$C') bus, a System Management Bus ('SMBus'), an Intelligent Platform Management Bus ('IPMB'), or the like.

The system management server (152) of FIG. 1 includes at least one computer processor (156) or 'CPU' as well as random access memory (168) ('RAM') which is connected through a high speed memory bus (166) and bus adapter (158) to processor (156) and to other components of the system management server (152). Stored in RAM (168) is a resource balancing module (102), a module of automated computing machinery improved for dynamically balancing resources in a server farm according to embodiments of the present invention. Represented here as computer program instructions stored in random access memory, the resource balancing module (102) may also be implemented as a complex programmable logic device ('CPLD'), a field programmable gate array ('FPGA'), an application specific integrated circuit ('ASIC'), and as other forms of automated computing machinery as will occur to those of skill in the art.

The resource balancing module (102) operates generally by monitoring CPU utilization in at least one of the functional server groups (110, 112). In the method of FIG. 1, monitoring CPU utilization is carried out by monitoring CPU utilization by out-of-band data communications directly between the system management server (152) and the servers (120) through out-of-band network (104). Each CPU on each server in each group can be configured to report its CPU utilization directly to the system management server through such an out-of-band network. Such reporting through an out-of-band network, although a common embodiment, is actually an optional alternative way of monitoring CPU utilization. Such reporting can also be implemented by use of an in band network such as the local area network (100) in the example of FIG. 1.

Resource balancing module (102) further identifies, in dependence upon the monitored CPU utilization (210), an overburdened functional server group when the overburdened functional server group's CPU utilization exceeds a CPU overburden threshold. The CPU utilization as reported by servers (120) may be compared to a predetermined overburden threshold. The overburden threshold may be chosen by a system administrator or recommended by, for example, a manufacturer of servers (120). When the CPU utilization of servers (120) in a functional server group (110) exceeds the CPU overburden threshold, functional server group (110) is identified as an overburdened functional server group. The overburden threshold may be implemented as a proportion of the overall processing power of all the servers in a functional server group—so that, for example, when the overall CPU utilization of the servers in a functional server group exceeds 90%, for example, the resource balancing module identifies such a group as an overburdened functional server group.

Resource balancing module (102) further increases CPU resources of the overburdened functional server group (110) by moving a transfer server from a source functional server group (112) into the overburdened functional server group (110). A source functional server group may be selected from among the functional server groups in server farm (114) whose CPU utilization is below the CPU overburden threshold. A server assigned to one or more data processing tasks of source functional server group (112) may be selected as the transfer server. After a transfer server is selected, the transfer server is reassigned to data processing tasks of overburdened functional server group (110). Moving the transfer server to overburdened functional server group (110) effectively increases the CPU bandwidth available for the data processing tasks of overburdened functional server group (110). Consequently, overall CPU utilization of the overburdened functional server group may be effectively reduced.

Also stored in RAM (168) is an operating system (154). Operating systems useful in dynamically balancing resources in a server farm according to embodiments of the present invention include UNIX™, Linux™, Microsoft XP™, Microsoft Vista™, IBM's AIX™, IBM's i5/OS™, and others as will occur to those of skill in the art. The operating system (154) and resource balancing module (102) in the example of FIG. 1 are shown in RAM (168), but many components of such software typically are stored in non-volatile memory also, such as, for example, in data storage (118).

The example system management server (152) of FIG. 1 includes one or more input/output ('I/O') adapters (178) coupled through expansion bus (160). I/O adapters implement user-oriented input/output through, for example, software drivers and computer hardware for controlling output to display devices such as computer display screens, as well as user input from user input devices (181) such as keyboards and mice. The example system management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example system management server (152) of FIG. 1 includes a communications adapter (167) for data communications with other devices such as servers (120) in functional server groups (110, 112), implementing data communications through local area network ("LAN") (100). Such data communications may be carried out through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically balancing resources in a server farm according to embodiments of the present invention include modems for wired dial-up communications, Ethernet (IEEE 802.3) adapters for wired data communications network communications, and 802.11 adapters for wireless data communications network communications. In some embodiments, communications may be provided through a switching fabric (116) as described in detail below either alternatively or in addition to communications adapter (167).

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (Hypertext Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
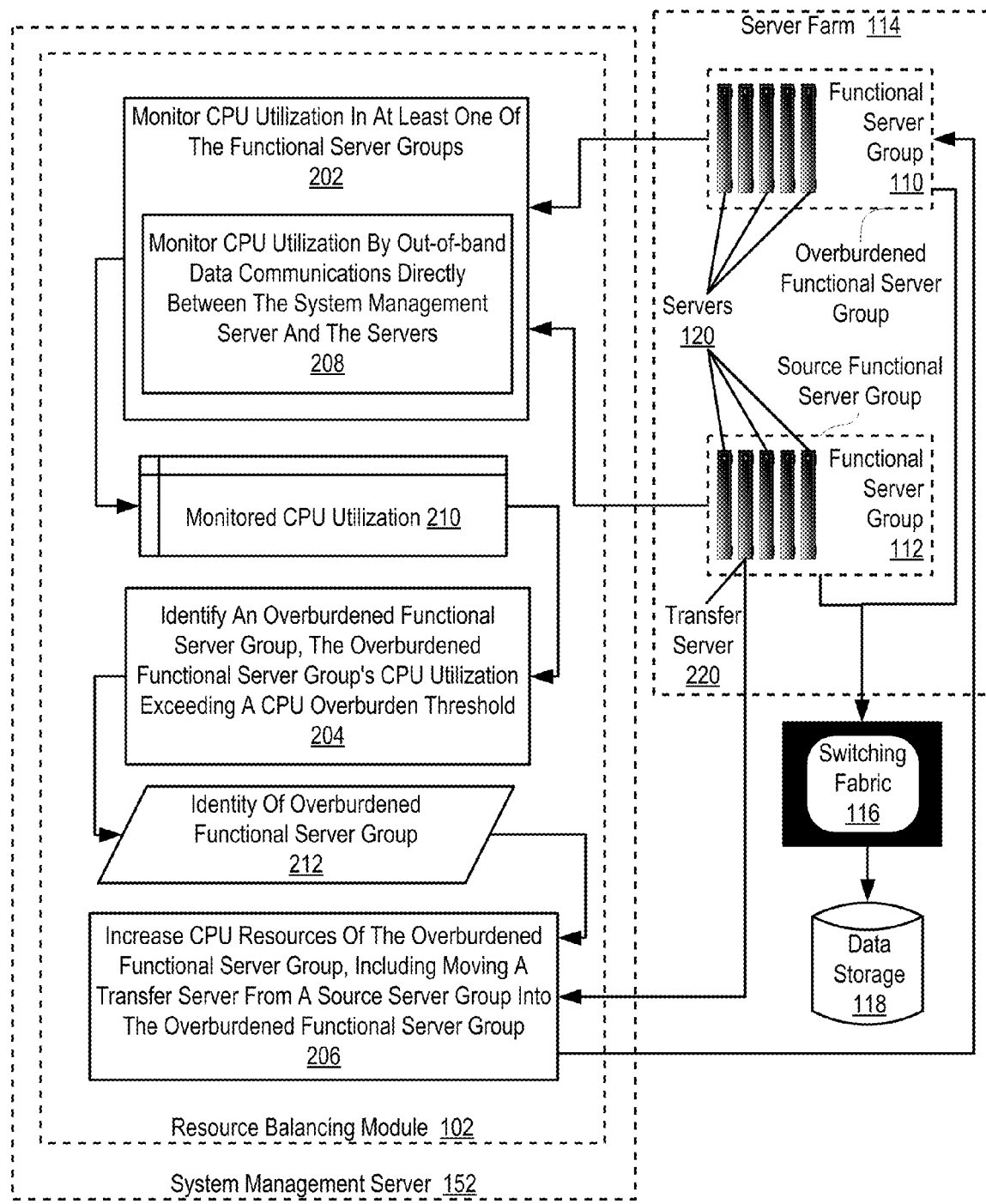
FIG. 2 sets forth a flow chart illustrating an example method of dynamically balancing resources in a server farm according to embodiments of the present invention.

For further explanation, FIG. 2 sets forth a flow chart illustrating an example method of dynamically balancing resources in a server farm according to embodiments of the present invention. The method of FIG. 2 is implemented on the kind of apparatus illustrated above and explained with regard to FIG. 1. The method of FIG. 2 is implemented in a server farm (114), where the server farm (114) includes a number of servers (120) organized in functional server groups (110, 112) with the servers (120) in each functional server group (110, 112) assigned a same type of data processing task. The servers (120) are operatively coupled to data storage (118) through a packet switching fabric (116), and the servers are operatively coupled to a system management server (152).

The method of FIG. 2 includes monitoring (202), by a resource balancing module (102) of the system management server (152), CPU utilization in at least one of the functional server groups (110, 112). In the method of FIG. 1, monitoring CPU utilization is carried out by monitoring CPU utilization by out-of-band data communications directly between the system management server (152) and the servers (120). Each CPU on each server in each group can be configured to report its CPU utilization directly to the system management server through an out-of-band network such as for example an $I^2C$ network or an SMB network. Such reporting through an out-of-band network, although a common embodiment, is actually an optional alternative way of monitoring CPU utilization. CPU utilization may be reported, for example, as an integer representing the percentage of time the CPU is not in the idle task. However, CPU utilization may be represented and reported in any number of different formats that may occur to persons skilled in the art. In other embodiments, the servers (120) report CPU utilization by monitoring clients executing on each server in the server farm that report their CPU utilizations to the system management server in IP or TCP packets or the like through a local area network (100 on FIG. 1).

The method of FIG. 2 also includes identifying (204), by the resource balancing module (102) in dependence upon the monitored CPU utilization (210), an overburdened functional server group (110) the overburdened functional server group's CPU utilization exceeding a CPU overburden threshold. The CPU utilization (210) as reported by servers (120) may be compared to a predetermined overburden threshold. The overburden threshold may be chosen by a system administrator or recommended by, for example, a manufacturer of servers (120). When the CPU utilization of servers (120) in a functional server group (110) exceeds the CPU overburden threshold, functional server group (110) is identified as an overburdened functional server group. The identity (212) of an overburdened functional server group may be held in RAM (168) of system management server (152). The identity (212) of an overburdened functional server group may also be stored in nonvolatile memory, for example data storage (118), and accessed at a later time.

The method of FIG. 2 also includes increasing (206), by the resource balancing module (102), CPU resources of the overburdened functional server group (110), including moving a transfer server (220) from a source functional server group (112) into the overburdened functional server group (110). A source functional server group may be selected from among the functional server groups in server farm (114) whose CPU utilization is below the CPU overburden threshold. For example, the functional server group with the lowest CPU utilization of all functional server groups in server farm (114) may be selected as the source functional server group. A server assigned to one or more data processing tasks of source functional server group (112) may be selected as the transfer server (220). A server from the source functional server group may be selected at random as the transfer server (220). Alternatively, the server in the source functional server group (112) with the lowest CPU utilization may be selected as the transfer server (220). Persons skilled in the art will recognize that criteria other than the examples above may be applied to select the transfer server (220) and the source functional server group. After a transfer server (220) is selected, the transfer server (220) is reassigned to data processing tasks of overburdened functional server group (110).

Moving the transfer server (220) to overburdened functional server group (110) effectively increases the CPU bandwidth available for the data processing tasks of overburdened functional server group (110). Consequently, overall CPU utilization of the overburdened functional server group may be effectively reduced. This step of increasing (206) CPU resources may occur at any time after an overburdened functional server group is identified. For example, resource balancing module (102) may generate an overburdened functional server group event upon detecting an overburdened functional server group. The step of increasing (206) CPU resources of the overburdened functional server group, then, may be implemented immediately upon the generation of an overburdened functional server group event. In other embodiments, the step of increasing (206) CPU resources of the overburdened functional server group may be implemented only when other preconditions, in addition to an overburdened functional server group event, exist. As an example of such an additional precondition, the increasing (206) step could be implemented only at certain times of day or at certain user levels.

The steps of monitoring (202) CPU utilization, identifying (204) an overburdened functional server group, and increasing (206) CPU resources of the overburdened functional server group may be repeated as many times as necessary, moving one server at a time until the CPU utilization of all functional server groups in server farm (114) is below the desired CPU overburden threshold.

Figure 3:
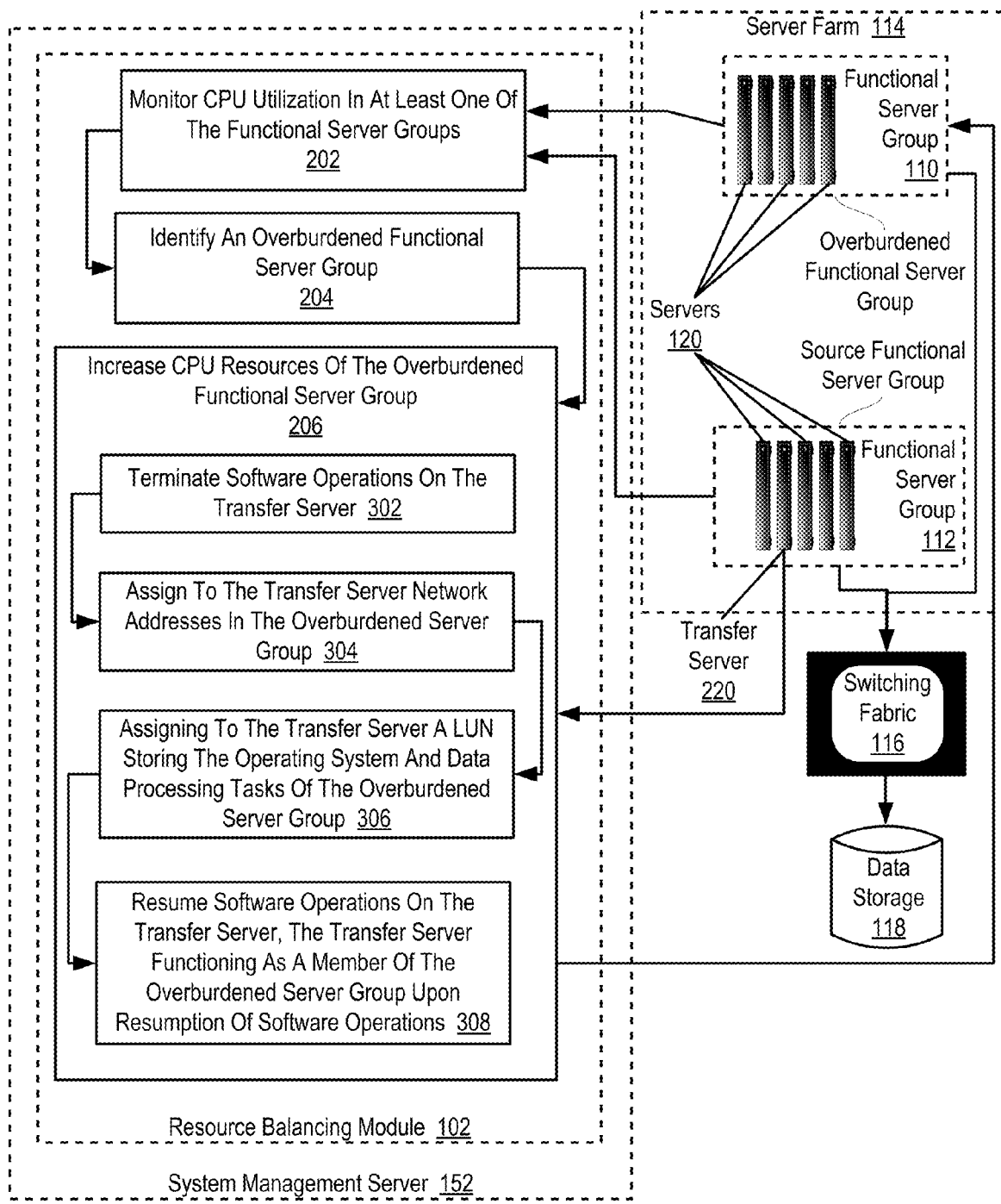
FIG. 3 sets forth a flow chart illustrating a further example method of dynamically balancing resources in a server farm according to embodiments of the present invention.

For further explanation, FIG. 3 sets forth a flow chart illustrating a further example method of dynamically balancing resources in a server farm according to embodiments of the present invention. The method of FIG. 3 is similar to the method of FIG. 2, including as it does monitoring CPU utilization (202), identifying an overburdened functional server group (204), and increasing the CPU resources of the overburdened functional server group (206). Also like the method of FIG. 2, the method of FIG. 3 is implemented in and upon apparatus of the kind illustrated and described with reference to FIG. 1. That is, the method of FIG. 3 is implemented in a server farm (114), where the server farm (114) includes a number of servers (120) organized in functional server groups (110, 112) with the servers (120) in each functional server group (110, 112) assigned a same type of data processing task. The servers (120) are operatively coupled to data storage (118) through a packet switching fabric (116), and the servers are operatively coupled to a system management server (152).

The method of FIG. 3 differs from the method of FIG. 2, however, in that in the method of FIG. 3, moving a transfer server (220) further includes terminating (302) software operations on the transfer server (220). Some or all data processing tasks assigned to source functional server group (112) are terminated on the transfer server (220) in order to provide CPU bandwidth for data processing tasks assigned to overburdened functional server group 110.

Also in the method of FIG. 3, moving a transfer server (220) further includes assigning (304) to the transfer server (220) network addresses in the overburdened functional server group. The type of network addresses sent to the transfer server (220) will vary according to specific network and server implementations and may include Media Access Control ("MAC") in Ethernet, World Wide Port Name ("WWPN") or World Wide Node Name ("WWNN") in Fibre Channel, or others as may occur to persons skilled in the art.

Also in the method of FIG. 3, moving a transfer server (220) further includes assigning to the transfer server (220) a Logical Unit Number ("LUN") storing the operating system and data processing tasks of the overburdened functional server group. The operating system and software necessary for the transfer server (220) to operate as a member of the overburdened functional server group is installed to the transfer server (220) as necessary according to the newly assigned LUN information. After network addresses and LUN information from the overburdened functional server group is assigned to the transfer server (220), the transfer server (220) effectively becomes a member of the overburdened functional server group.

Also in the method of FIG. 3, moving a transfer server (220) further includes resuming software operations on the transfer server (220). The transfer server (220) is booted to the appropriate operating system and the data processing tasks of the overburdened functional server group are started on the transfer server (220). After software operations the transfer server (220) are resumed, the transfer server (220) functions as a member of the overburdened functional server group, effectively increasing the CPU bandwidth available to handle the data processing tasks of overburdened functional server group (110) and decreasing overall CPU utilization of overburdened functional server group (110).

Figure 4:
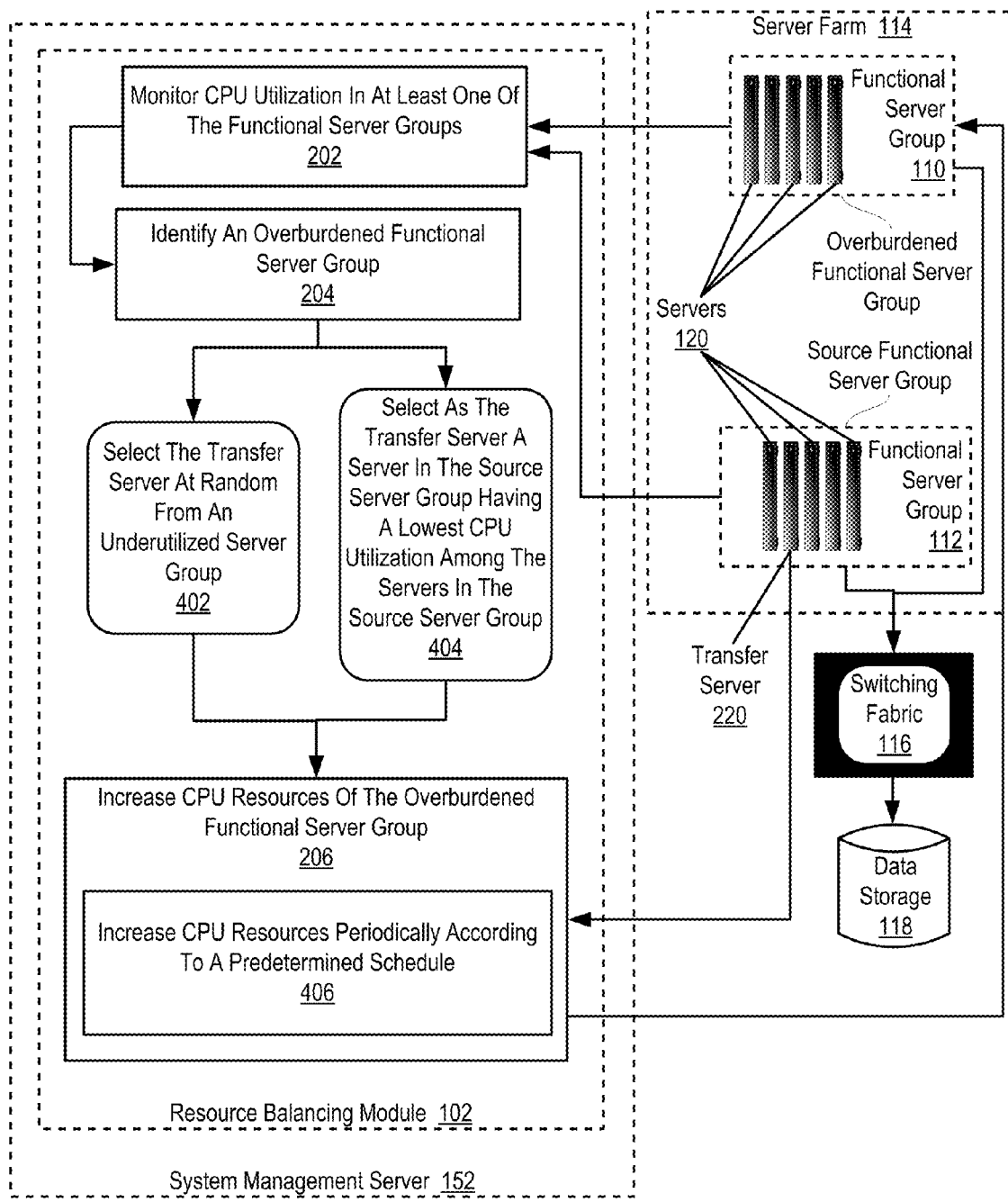
FIG. 4 sets forth a flow chart illustrating a further example method of dynamically balancing resources in a server farm according to embodiments of the present invention.

For further explanation, FIG. 4 sets forth a flow chart illustrating a further example method of dynamically balancing resources in a server farm according to embodiments of the present invention. The method of FIG. 4 is similar to the method of FIG. 2, including as it does monitoring (202), identifying (204), and increasing (206). Also like the method of FIG. 2, the method of FIG. 4 is implemented in and upon apparatus of the kind like FIG. 1 in that the method of FIG. 4 is implemented in a server farm (114), where the server farm (114) includes a number of servers (120) organized in functional server groups (110, 112) with the servers (120) in each functional server group (110, 112) assigned a same type of data processing task. The servers (120) are operatively coupled to data storage (118) through a packet switching fabric (116), and the servers are operatively coupled to a system management server (152).

The method of FIG. 4 differs from the method of FIG. 2, however, in that in the method of FIG. 4 further includes selecting the transfer server (220) by selecting (402) the transfer server (220) at random from an underutilized server group or by selecting (404) as the transfer server (220) a server in the source functional server group having the lowest CPU utilization of all servers in the source functional server group. An underutilized functional server group is any functional server group in server farm (114) whose CPU utilization is below the predetermined CPU overburden threshold. Similarly to the selection of the transfer server (220), the source functional server group may be selected at random from all underutilized functional server groups in the server farm (114), or the functional server group with the lowest overall CPU utilization in the server farm (114) may be selected as the source functional server group. Persons skilled in the art will understand that other criteria may be applied in lieu of or in addition to the examples given above for selecting a transfer server (220) and source functional server group.

The method of FIG. 4 further differs from the method of FIG. 2 in that in the method of FIG. 4, the step of increasing (206) CPU resources of the overburdened functional server group occurs periodically according to a predetermined schedule. The predetermined schedule may be set, for example, by a system administrator. Identified overburdened functional server groups can be listed in data storage, and the process for increasing CPU resources can be called on a predetermined schedule, for example, once every sixty seconds, to increase CPU resources for all listed overburdened functional server groups. As an optional alternative to periodically increasing CPU resources, the process of increasing CPU resources in an overburdened functional server group can be triggered in an event-driven fashion promptly when an overburdened functional server group is identified.

Figure 5:
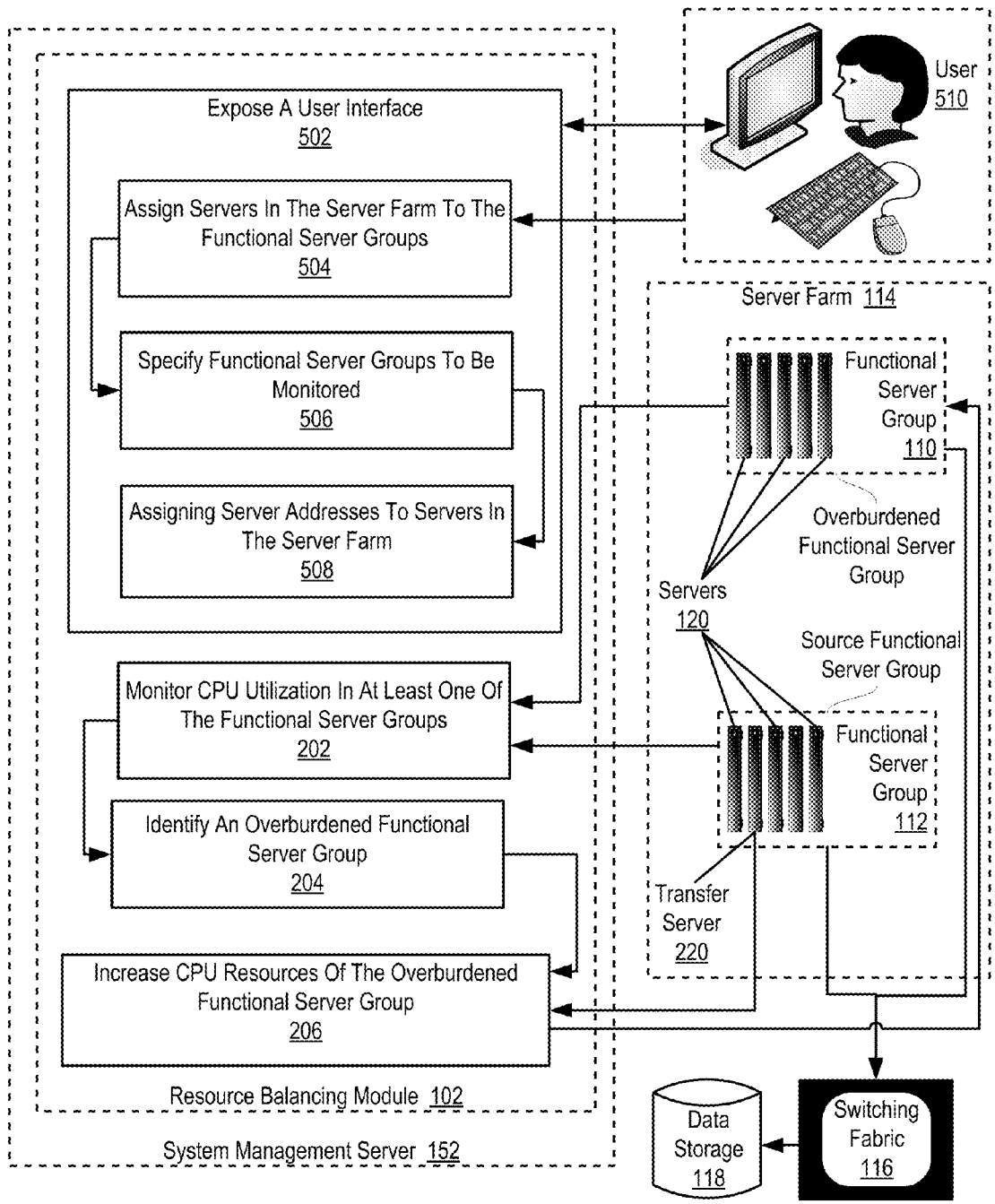
FIG. 5 sets forth a flow chart illustrating a further example method of dynamically balancing resources in a server farm according to embodiments of the present invention.

For further explanation, FIG. 5 sets forth a flow chart illustrating a further example method of dynamically balancing resources in a server farm according to embodiments of the present invention. The method of FIG. 5 is similar to the method of FIG. 2, including as it does monitoring (202), identifying (204), and increasing (206). Also like the method of FIG. 2, the method of FIG. 5 is implemented in and upon apparatus of the kind like FIG. 1 in that the method of FIG. 5 is implemented in a server farm (114), where the server farm (114) includes a number of servers (120) organized in functional server groups (110, 112) with the servers (120) in each functional server group (110, 112) assigned a same type of data processing task. The servers (120) are operatively coupled to data storage (118) through a packet switching fabric (116), and the servers are operatively coupled to a system management server (152).

The method of FIG. 5 differs from the method of FIG. 2, however, in that the method of FIG. 5 further includes exposing by the resource balancing module a user interface providing a user (510) with access to various functions useful for dynamically balancing resources in a server farm according to embodiments of the present invention. The user interface may be, for example, a command line interface, a graphical user interface, a web user interface, or another type of interface as will occur to those of skill in the art.

The user interface according to the method of FIG. 5 may provide a user access to the function of assigning servers in the server farm (114) to functional server groups. A user (510) may define the operating systems and data processing tasks to be associated with each functional server group. A user (510) may further assign each individual server to a particular functional server group. A user might wish, for example, to assign more powerful servers or a larger number of servers to functional server groups that are associated with more CPU-intensive data processing tasks. Persons skilled in the art will recognize other motivations and strategies that may arise for defining functional server groups and assigning servers to them.

The user interface according to the method of FIG. 5 may further provide a user access to the function of specifying the functional server groups to be monitored. A user (510) may choose to exclude one or more functional server groups in the server farm (114) from the tasks of the resource balancing module. Such an excluded server would be exempt from having its servers reassigned to a different functional server group by the resource balancing module (102) for the purpose of dynamically balancing resources in a server farm. An excluded server group would further be exempt from being assigned any new servers by the resource balancing module (102) for the purpose of dynamically balancing resources in a server farm. An excluded functional server group might still report CPU utilization to system management server 152, but be exempt from the steps of monitoring (202) CPU utilization, identifying (204) an overburdened functional server group, and increasing (206) CPU resources of the overburdened functional server group. Alternatively, an excluded server might not report CPU utilization at all. The user interface may also allow a user (510) to "lock" one or more individual servers to a particular functional work group, such that a locked server would be exempt from being reassigned by the resource balancing module (102) to a different functional server group.

The user interface according to the method of FIG. 5 may further provide a user access to the function of assigning server addresses and LUNs to servers in the server farm. The type of network addresses to be assigned, as described above with reference to FIG. 3, will vary according to specific network and server implementations and may include Media Access Control ("MAC") in Ethernet, World Wide Port Name ("WWPN") or World Wide Node Name ("WWNN") in Fibre Channel, or others as may occur to persons skilled in the art. Further as described above with reference to FIG. 3, the operating system and software necessary for the transfer server (220) to operate as a member of the overburdened functional server group is installed to the transfer server (220) as necessary according to the newly assigned LUN information. The appropriate network addresses and LUN may be assigned to a server automatically without further user interaction when a user (510) assigns the server to a particular functional server group. According to some embodiments, a user (510) may be provided the capability to manually assign network addresses and LUN information to a particular server.

Figure 6:
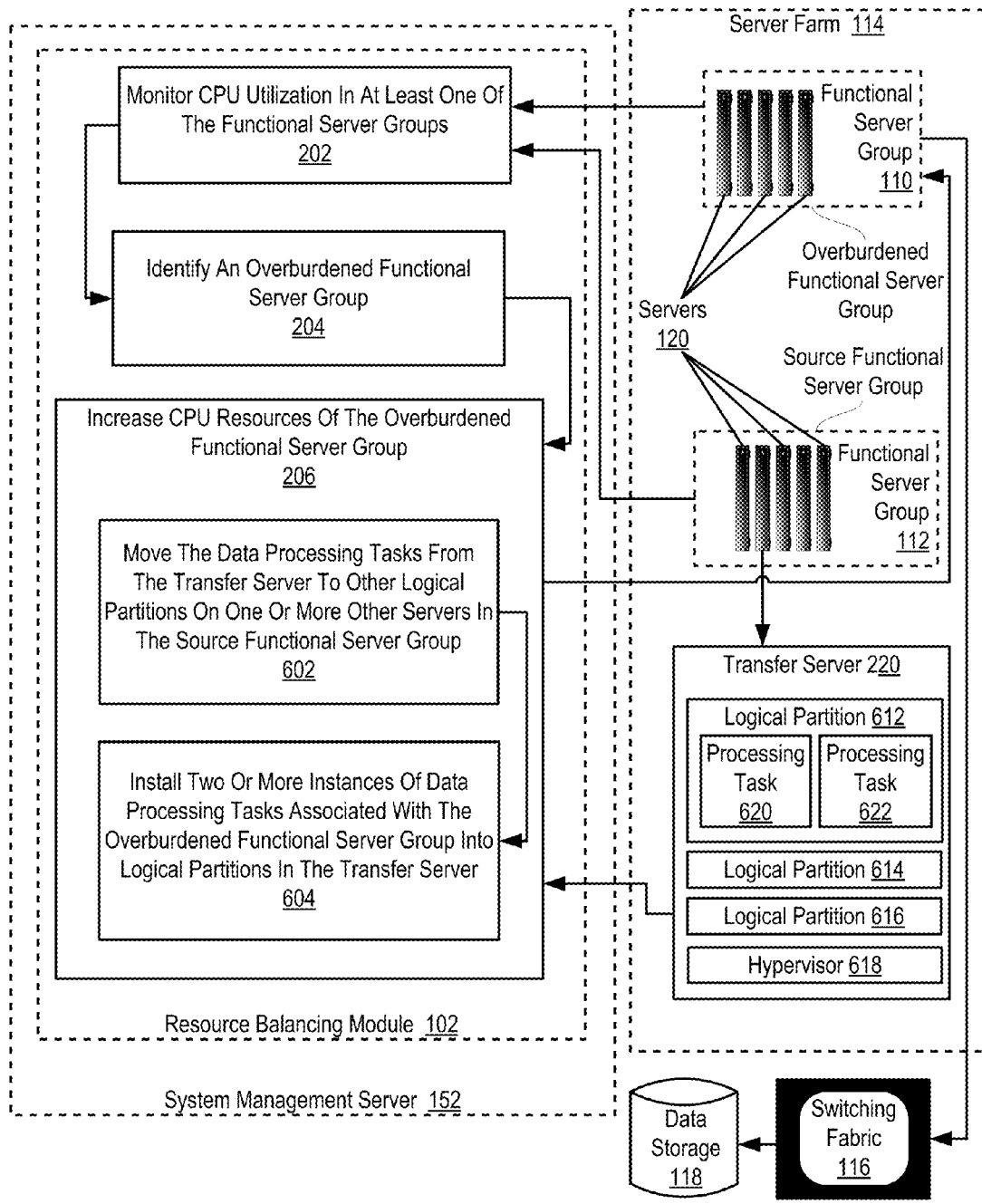
FIG. 6 sets forth a flow chart illustrating a further example method of dynamically balancing resources in a server farm according to embodiments of the present invention.

For further explanation, FIG. 6 sets forth a flow chart illustrating a further example method of dynamically balancing resources in a server farm according to embodiments of the present invention. The method of FIG. 6 is similar to the method of FIG. 2, including as it does monitoring (202), identifying (204), and increasing (206). Also like the method of FIG. 2, the method of FIG. 6 is implemented in and upon apparatus of the kind like FIG. 1 in that the method of FIG. 6 is implemented in a server farm (114), where the server farm (114) includes a number of servers (120) organized in functional server groups (110, 112) with the servers (120) in each functional server group (110, 112) assigned a same type of data processing task. The servers (120) are operatively coupled to data storage (118) through a packet switching fabric (116), and the servers are operatively coupled to a system management server (152).

The method of FIG. 6 differs from the method of FIG. 2, however, in that the transfer server (220) is further defined to include a number of data processing tasks (620, 622) executing in a number of logical partitions (612, 614, 616) on the transfer server (220). Further, the overburdened functional server group (110) includes a number of data processing tasks executing in a number of logical partitions on each of the servers in the overburdened functional server group (110).

A logical partition, also referred to as a 'virtual machine,' is a set of data structures and services that enable distribution of computer resources within a single computer or server to make the computer or server function as if it were two or more independent computers. Logical partitions may be implemented in part by a hypervisor (118). A hypervisor is a layer of system software that runs on the computer hardware beneath the operating system layer to allow multiple operating systems to run on a host computer at the same time. Hypervisors were originally developed in the early 1970's, when company cost reductions were forcing multiple scattered departmental computers to be consolidated into a single, larger computer—the mainframe—that would serve multiple departments. By running multiple operating systems simultaneously, the hypervisor brought a measure of robustness and stability to the system. Even if one operating system crashed, the others would continue working without interruption. Indeed, this even allowed beta or experimental versions of the operating system to be deployed and debugged without jeopardizing the stable main production system and without requiring costly second and third systems for developers to work on.

A hypervisor (118) allows multiple operating systems to run on a host computer at the same time by providing each operating system with its own set of computer resources. These computer resources are typically virtualized counterparts to the physical resources of a computing system. A hypervisor (118) allocates these resources to each operating system using logical partitions. Using a logical partition, therefore, a hypervisor provides a layer of abstraction between a computer hardware layer of a computing system and an operating system layer.

The method of FIG. 6 further differs from the method of FIG. 2, however, in that in the method of FIG. 6, increasing CPU resources of the overburdened functional server group further includes moving (602) the data processing tasks from the transfer server (220) to other logical partitions on one or more other servers in the source functional server group. Moving step (602) is necessary to ensure that all data processing tasks associated with the source functional server group that are being processed by the transfer server (220) will be processed by other servers in the source functional server group after the transfer server (220) has been moved to the overburdened functional server group.

Also in the method of FIG. 6, increasing CPU resources of the overburdened functional server group further includes installing two or more instances of data processing tasks associated with the overburdened functional server group into logical partitions on the transfer server (220). Data processing tasks may be reassigned to the transfer server (220) from other servers in the overburdened functional server group (110). Alternatively, data processing tasks associated with the overburdened functional server group may be implemented on transfer server (220) as simultaneous processes duplicative of processes already running on other servers in the overburdened functional server group.

Example embodiments of the present invention are described largely in the context of a fully functional computer system for dynamically balancing resources in a server farm. Readers of skill in the art will recognize, however, that the present invention also may be embodied in a computer program product embodied in a tangible recordable media for use with any suitable data processing system. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically balancing data processing resources in a server farm, the server farm comprising a plurality of servers organized in functional server groups with the servers in each functional server group assigned a same type of data processing task, the servers operatively coupled to data storage through a packet switching fabric, the servers operatively coupled to a system management server, the method comprising:
  monitoring, by a resource balancing module of the system management server, CPU utilization in at least one of the functional server groups;
  identifying, by the resource balancing module in dependence upon the monitored CPU utilization, an overburdened functional server group, the overburdened functional server group's CPU utilization exceeding a CPU overburden threshold; and
  increasing, by the resource balancing module, CPU resources of the overburdened functional server group, including moving a transfer server from a source functional server group into the overburdened functional server group;
  wherein moving a transfer server further comprises:
  terminating software operations on the transfer server;
  assigning to the transfer server network addresses in the overburdened functional server group;
  assigning to the transfer server a LUN storing the operating system and data processing tasks of the overburdened functional server group; and
  resuming software operations on the transfer server, the transfer server functioning as a member of the overburdened functional server group upon resumption of software operations.

2. The method of claim 1 wherein monitoring CPU utilization further comprises monitoring CPU utilization by out-of-band data communications directly between the system management server and the servers.

3. The method of claim 1 further comprising selecting the transfer server at random from an underutilized server group.

4. The method of claim 1 further comprising selecting as the transfer server a server in the source functional server group having a lowest CPU utilization among the servers in the source functional server group.

5. The method of claim 1, wherein increasing CPU resources of the overburdened functional server group further comprises increasing CPU resources periodically according to a predetermined schedule.

6. The method of claim 1, further comprising exposing by the resource balancing module a user interface providing user access to the functions of:
  assigning servers in the server farm to the functional server groups;
  specifying functional server groups to be monitored; and
  assigning server addresses and LUNs to servers in the server farm.

7. The method of claim 1, wherein:
  the transfer server comprises a plurality of data processing tasks executing in a plurality of logical partitions on the transfer server;
  the overburdened functional server group comprises a plurality of data processing tasks executing in a plurality of logical partitions on each of the servers in the overburdened functional server group; and
  the method further comprises:
  moving the data processing tasks from the transfer server to other logical partitions on one or more other servers in the source functional server group; and
  installing two or more instances of data processing tasks associated with the overburdened functional server group into logical partitions in the transfer server.

8. An apparatus for dynamically balancing data processing resources in a server farm, the server farm comprising a plurality of servers organized in functional server groups with the servers in each functional server group assigned a same type of data processing task, the servers operatively coupled to data storage through a packet switching fabric, the servers operatively coupled to a system management server, the apparatus comprising a computer processor, a computer memory operatively coupled to the computer processor, the computer memory having disposed within it computer program instructions capable of:

monitoring, by a resource balancing module of the system management server, CPU utilization in at least one of the functional server groups;

identifying, by the resource balancing module in dependence upon the monitored CPU utilization, an overburdened functional server group, the overburdened functional server group's CPU utilization exceeding a CPU overburden threshold; and increasing, by the resource balancing module, CPU resources of the overburdened functional server group, including moving a transfer server from a source functional server group into the overburdened functional server group;

wherein moving a transfer server further comprises:

terminating software operations on the transfer server;

assigning to the transfer server network addresses in the overburdened functional server group;

assigning to the transfer server a LUN storing the operating system and data processing tasks of the overburdened functional server group; and resuming software operations on the transfer server, the transfer server functioning as a member of the overburdened functional server group upon resumption of software operations.

9. The apparatus of claim 8 wherein monitoring CPU utilization further comprises monitoring CPU utilization by out-of-band data communications directly between the system management server and the servers.

10. The apparatus of claim 8, wherein increasing CPU resources of the overburdened functional server group further comprises increasing CPU resources periodically according to a predetermined schedule.

11. The apparatus of claim 8 wherein the computer memory further includes instructions for exposing by the resource balancing module a user interface providing user access to the functions of:

assigning servers in the server farm to the functional server groups;

specifying functional server groups to be monitored; and assigning server addresses and LUNs to servers in the server farm.

12. The apparatus of claim 8, wherein:

the transfer server comprises a plurality of data processing tasks executing in a plurality of logical partitions on the transfer server;

the overburdened functional server group comprises a plurality of data processing tasks executing in a plurality of logical partitions on each of the servers in the overburdened functional server group; and the computer memory further includes program instructions capable of:

moving the data processing tasks from the transfer server to other logical partitions on one or more other servers in the source functional server group; and installing two or more instances of data processing tasks associated with the overburdened functional server group into logical partitions in the transfer server.

13. A computer program product embodied on a computer-readable medium for dynamically balancing data processing resources in a server farm, wherein the computer-readable medium is not a signal, the server farm comprising a plurality of servers organized in functional server groups with the servers in each functional server group assigned a same type of data processing task, the servers operatively coupled to data storage through a packet switching fabric, the servers operatively coupled to a system management server, the apparatus comprising a computer processor, a computer memory operatively coupled to the computer processor, the computer program product comprising:

computer program instructions for monitoring, by a resource balancing module of the system management server, CPU utilization in at least one of the functional server groups;

computer program instructions for identifying, by the resource balancing module in dependence upon the monitored CPU utilization, an overburdened functional server group, the overburdened functional server group's CPU utilization exceeding a CPU overburden threshold; and computer program instructions for increasing, by the resource balancing module, CPU resources of the overburdened functional server group, including moving a transfer server from a source functional server group into the overburdened functional server group; wherein moving a transfer server further comprises:

terminating software operations on the transfer server;

assigning to the transfer server network addresses in the overburdened functional server group;

assigning to the transfer server a LUN storing the operating system and data processing tasks of the overburdened functional server group; and resuming software operations on the transfer server, the transfer server functioning as a member of the overburdened functional server group upon resumption of software operations.

14. The computer program product of claim 13 wherein monitoring CPU utilization further comprises monitoring CPU utilization by out-of-band data communications directly between the system management server and the servers.

15. The computer program product of claim 13, wherein increasing CPU resources of the overburdened functional server group further comprises increasing CPU resources periodically according to a predetermined schedule.

16. The computer program product of claim 13 further comprising computer program instructions for exposing by the resource balancing module a user interface providing user access to the functions of:

assigning servers in the server farm to the functional server groups;

specifying functional server groups to be monitored; and assigning server addresses and LUNs to servers in the server farm.

17. The computer program product of claim 13, wherein:

the transfer server comprises a plurality of data processing tasks executing in a plurality of logical partitions on the transfer server;

the overburdened functional server group comprises a plurality of data processing tasks executing in a plurality of logical partitions on each of the servers in the overburdened functional server group; and the computer program product further comprises:

computer program instructions for moving the data processing tasks from the transfer server to other logical partitions on one or more other servers in the source functional server group; and computer program instructions for installing two or more instances of data processing tasks associated with the overburdened functional server group into logical partitions in the transfer server.

* * * * *